United States Patent [19]
Hammarstrom et al.

[11] Patent Number: 5,976,204
[45] Date of Patent: Nov. 2, 1999

[54] ABRASIVE ARTICLES AND METHOD FOR PREPARING THEM

[75] Inventors: Janet L. Hammarstrom, Auburn; Michael J. Lemberger, Worcester; Mark W. Rowden, Leicester, all of Mass.; Arno Gardziella, Witten, Germany

[73] Assignee: Norton Company, Worcester, Mass.

[*] Notice: This patent is subject to a terminal disclaimer.

[21] Appl. No.: 08/894,234

[22] PCT Filed: Nov. 1, 1995

[86] PCT No.: PCT/US95/14087

§ 371 Date: Apr. 25, 1997

§ 102(e) Date: Apr. 25, 1997

[87] PCT Pub. No.: WO96/14187

PCT Pub. Date: May 17, 1996

Related U.S. Application Data

[63] Continuation-in-part of application No. 08/333,178, Nov. 2, 1994.

[51] Int. Cl.$^6$ .................................................. B24D 3/28
[52] U.S. Cl. .................................. 51/298; 51/295
[58] Field of Search .................... 51/293, 295, 298

[56] References Cited

U.S. PATENT DOCUMENTS

| | | | |
|---|---|---|---|
| 3,619,151 | 11/1971 | Sheets, Jr. et al. | 51/307 |
| 3,878,160 | 4/1975 | Grazen et al. | 260/38 |
| 4,083,891 | 4/1978 | Bowers et al. | 51/298 |
| 4,099,934 | 7/1978 | Suzuki et al. | 51/295 |
| 4,101,500 | 7/1978 | Brodsky | 260/38 |
| 4,264,557 | 4/1981 | Annis | 264/328.1 |
| 4,918,116 | 4/1990 | Gardziella et al. | 523/149 |
| 5,131,923 | 7/1992 | Markhoff-Matheny et al. | 51/293 |
| 5,135,892 | 8/1992 | Ellison-Hayashi et al. | 501/1 |
| 5,399,606 | 3/1995 | Konig et al. | 524/385 |
| 5,611,827 | 3/1997 | Hammarstrom et al. | 51/293 |
| 5,658,360 | 8/1997 | Keil | 51/298 |

FOREIGN PATENT DOCUMENTS

| | | |
|---|---|---|
| 595003 A1 | 9/1993 | European Pat. Off. . |
| 77-2520 | 9/1976 | France . |
| 5-4077390 | 6/1979 | Japan . |
| 6-2246474 | 10/1987 | Japan . |
| 935260 | 10/1982 | U.S.S.R. .......... B24D 3/28 |
| 1423363 | 9/1988 | U.S.S.R. . |
| 1611719 | 12/1990 | U.S.S.R. . |
| 1798148 | 2/1993 | U.S.S.R. . |

OTHER PUBLICATIONS

J.F. Monk; Thermosetting Plastics, Chapter 3; "Compression Moulding of Thermosetting Materials"; pp. 41/71 No Date.

Kirk–Othmer Encyclopedia of Chemical Technology, Third Edition, vol. 17; "Phenolic Resins"; pp. 384/416 No Date.

Bakelite® publication; Rutaphen®–Resins for Grinding Wheels–Technical Information (KN 50E–09. 92–G&S–BA) No Date.

Bakelite® publication: Rutaphen® Phenolic Resins—Guide/Product Ranges/Application (KN 107/e10.89 GS–BG) pp. 80/81 No Date.

*Primary Examiner*—Timothy Speer
*Attorney, Agent, or Firm*—Mary E. Porter

[57] ABSTRACT

A continuous method for preparing a granular molding material for abrasive articles has been developed. The method includes the step of continuously blending an abrasive material with a curing agent and measured portions of phenol-novolac resins, at least one of which has a phenol-formaldehyde molar ratio in the range of about 1:0.2 to 1:0.35. The resulting product is a flowable, granular material homogeneously coated with the phenol-novolac resins. The product can be directly molded, i.e., without an aging step, into various improved abrasive articles, such as grinding wheels, comprising a homogeneous distribution of abrasive grain and having a low volatile organic chemical content.

28 Claims, 1 Drawing Sheet

STANDARD

STANDARD

OSP

ABRASIVE ARTICLES AND METHOD FOR PREPARING THEM

This is a continuation-in-part of U.S. Ser. No. 08/333, 178, filed Nov. 2, 1994.

This invention relates to bonded abrasive articles and to a method for manufacturing the articles, including the preparation of precursor grain mixtures.

BACKGROUND OF THE INVENTION

Resin-bonded abrasive articles such as grinding wheels are typically produced by blending discrete abrasive particles with a liquid binder material and a powdered resin, and then pressing the mixture under appropriate thermal conditions. Other constituents can be included in the mixtures, e.g., fillers, curing agents, wetting agents, and various metal powders. An aging period which allows for salvation of the dry portion of the mixture with the liquid resin is usually required before pressing.

As noted in U.S. Pat. No. 4,918,116 (Gardziella et al), novolac resins have often been used as solutions in solvent-based systems for binding abrasive articles. A disadvantage of such a system is the easy ignitability of the solvents at high temperatures. While solvent-free modified novolacs have been developed, these materials are quite expensive, and their commercial use may often not be economical.

In addition to the difficulties involved will using certain novolac binders for making abrasive articles, manufacturers are sometimes faced with other production problems as well. For example, as pointed out in Gardziella, the use of liquid grain wetting agents such as furfural when preparing molding materials for abrasive discs may result in an unstable molding mixture. Furthermore, the use of such a mixture may generate a large amount of dust—often a drawback on the manufacturing floor.

The dust and stability problems associated with using novolac binders appears to have been somewhat alleviated by the teachings set forth in Gardziella. This reference discloses the preparation of various molding materials, using specific phenol-novolacs having a phenol-formaldehyde molar ratio of 1:0.2 to 1:0.35. As an example, abrasive discs are prepared by using heated corundum grains wetted with a not melt of the specified phenol-novolacs. After being blended at 140° C. in a high-power mixer, the composition is cooled to 90° C. and then further blended with a second novolac resin and a curing agent.

The type of novolac resins discussed in Gardziella may be used in a multi-step process for preparing a precursor molding material for abrasive articles. This process involves applying a heated, liquid novolac resin to abrasive particles by a mixing technique, followed by the application of a dry bonding material. The dry material usually includes another novolac resin, fillers, and one or more curing agents. The sequence of applying liquid resin and dry binding material is repeated in two or more discrete steps to eventually obtain dry, flowable, homogeneously-coated abrasive grains.

From this brief discussion, it should be apparent that there are advantages and disadvantages involved in using various novolac resins to prepare articles like abrasive discs. A process which does not require high-power mixers and temperatures as high as 140° C. is commercially attractive. Additional economic benefits result from a continuous process which does not require multiple applications of liquid binder and dry binder, and which does not call for the heating and cooling cycles described in Gardziella. Moreover, elimination of the time-consuming aging step before pressing is another major improvement.

Ideally, these process improvements would not occur at the expense of material properties. For example, the attainment of flowable, homogeneously-coated abrasive grains (which are also substantially dust-free) as a molding material for abrasive wheels is an important objective in a manufacturing setting.

The homogeneous surface coating on the abrasive grain of the molding material of this invention causes substantially all abrasive grain to be uniformly distributed through the abrasive article prepared from the molding material. The abrasive article, both in its green and its cured state, is substantially free of bond rich regions, providing a uniform distribution of abrasive grains throughout the cross-section of the abrasive article. Because the abrasive grain is uniformly distributed, an abrasive wheel made from the molding mix is balanced. In traditional manufacturing processes, the abrasive wheel must be balanced by removing out a portion or the side or the wheel so that the wheel is true and spins in a balanced fashion during grinding operation. Many wheels which are out of balance are rejected, causing production losses. The elimination of all or some of the balancing steps from the manufacturing process is a significant improvement. In addition, the uniform distribution of abrasive grain provides better grinding performance and longer wheel life during use.

Finally, the characteristics of the abrasive article should remain very attractive. In the case of an abrasive wheel, the desirable properties include grindability and long working life.

SUMMARY OF THE INVENTION

This invention provides a bonded abrasive article consisting of a consolidated matrix of abrasive grain granules having a continuous, uniform surface coating of an organic bond, wherein the consolidated matrix comprises less than 0.5% by weight, volatile organic chemicals, and has a uniform distribution of abrasive grain in the organic bond, and wherein the bonded abrasive article has improved grinding life.

The organic bond material comprises at least one liquid phenol-novolac resin and at least one curing agent suitable for the resin, and, preferably, at least one powdered phenol-novolac resin.

Also provided herein is a continuous method for preparing a granular molding material for abrasive articles. In this method, the abrasive grain is continuously blended with measured portion of liquid phenol-novolac resin having a phenol-formaldehyde molar ratio in the range of about 1:0.2 to about 1:0.35, and heated to a temperature sufficient to yield a resin viscosity- of about 300 cp; and then continuously adding a dry blend of at least one second, powdered phenol-novolac resin and at least one curing agent to the abrasive grain and liquid resin. The blending step is carried out at a temperature range of about 80° C. to about 130° C. so that the granular molding material resulting from the process is a flowable, granular material homogeneously coated with the resins and other bond components.

DETAILED DESCRIPTION OF THE INVENTION

Figure 1:
FIG. 1 is a photographic image of a cross-sectional view of a conventional abrasive article, showing uneven distribution of abrasive grain (light areas) and bone rich regions (dark areas) within the consolidated matrix.
Figure 2:
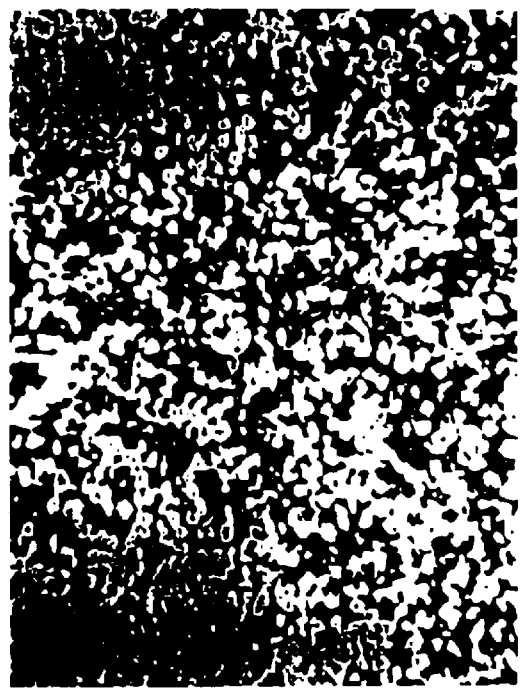
FIG. 2 is a photographic image of a cross-section of an abrasive article of the invention, showing uniform distribution of abrasive grain and the absence of any substantial bond rich region.

The abrasive material used for this invention may be either a conventional material or a superabrasive. Conventional abrasives are well-known in the art, and include, for example, aluminum oxide, silicon carbide, zirconia-alumina, garnet, emery, and flint. Superabrasives are also known in the art. Examples are diamond, cubic boron nitride (CBN), and boron suboxide (described in U.S. Pat. No. 5,135,892 which is hereby incorporated by reference). Various mixtures of abrasive materials are also contemplated, e.g., a mixture of aluminum oxide and zirconia alumina. The total amount of abrasive material employed in the process described below is an amount which will constitute about 40 to about 70 volume % of any abrasive body prepared by this process.

The average particle size of grains (sometimes referred to as "grits") of the abrasive material depends on a variety of factors, such as the particular abrasive utilized, as well as the end use of tools formed from the abrasive body. In general, an average particle size for superabrasives and conventional abrasives is in the range of about 0.5 to about 5000 micrometers, and preferably, in the range of about 2 to 200 micrometers. Those of ordinary skill in the art will be able to select the most appropriate abrasive particle size for a desired application without undue experimentation.

In some embodiments, this invention can include a sol-gel-derived abrasive. Primary examples of these are the sol-gel alumina abrasive grits, which can be seeded or unseeded. These types of materials are described, for example, in U.S. Pat. No. 5,131,923, which is hereby incorporated by reference.

The abrasive material may be used at room temperature. However, it is preferably preheated before blending begins, e.g., to a temperature in the range of about 30° C. to about 150° C. In especially preferred embodiments, the temperature Difference is within about 25° C. of that of a liquid phenol-novolac resin which will be blended in as the first component. This matching of material temperature will minimize viscosity increases which would occur when heated resinous material contacts colder abrasive particles.

The liquid phenol-novolac resin is described in U.S. Pat. No. 4,918,116 (Gardziella), which is hereby incorporated by reference. As described in Gardziella, this type of resin has a phenol-formaldehyde molar ratio in the range of 1:0.2 to 1:0.35. The resins used herein can be produced very economically, and usually have a content of free phenol of less than about 0.5%, and are substantially free of volatile organic chemicals (VOCs). These resins also have a very high adhesive holding power, giving them very good processing properties. In the case of bonded abrasive wheels, for example, the use of these resins results in very free-flowing uniform granules for the molding material. An additional attribute of the granules is their stability, which guarantees long storage life.

The liquid phenol novolacs are usually prepared by condensation, as described in Gardziella. The preferred molecular weight of these materials for the purpose of the present invention is in the range of about 200 to about 1000, weight average.

The liquid phenol-novolacs are solid at room temperature, and begin to melt above 25° C. At 70° C., they have a relatively low melting viscosity, making them easy to handle and blend with the other components. The low melting viscosity obviates the need for solvents during the blending step. They are preferably preheated to a temperature sufficient to yield a viscosity in the range of about 150 mPa (150 cp) to about 3000 mPa (3000 cp) before being delivered to the mixer. The preferred viscosity lies in the range of about 150 mPa (150 cp) to about 800 mPa (800 cp), which corresponds to a temperature of about 130° C. to about 115° C.

A second, powdered phenol-novolac resin is used in the bond. The nature of this resin is not critical, although its phenol-novolac ratio preferably lies outside of the ratio or the liquid resin. It can, for example, be one of the materials generally described in the *Kirk-Othmer Encyclopedia* of chemical Technology, Third Edition, Volume 17, pages 384 to 416, the contents of which are hereby incorporated by reference. Suitable phenol novolacs are also described in U.S. Pat. Nos. 4,264,557 (Annis) and 3,878,160 (Grazen et al), and both are hereby incorporated by reference.

In this invention, the powdered phenol-novolac will typically have a phenol-formaldehyde molar ratio in the range of about 1:0.5 to about 1:0.9. Like the liquid resin, these materials are also solid at room temperature, and begin to melt above about 70° C. However, these materials are delivered to the mixer as solids, i.e., below their melting point. Preferably, they are used at room temperature, in the form of a powdery mix with some of the optional constituents described below.

The preferred molecular weight of the powdered phenol-novolac is in the range of about 1,000 to about 10,000. An especially preferred molecular weight range is usually about 1,000 to about 2,000.

In regard to the relative amounts of phenol-novolac resins used herein, the weight ratio of liquid resin to powdered resin, excluding other ingredients, is usually in the range of about 7:1 to about 1:7. An especially preferred ratio for most embodiments of this invention lies in the range of about 3:1 to about 1:3.

The powdered resin of this invention can be used as a blend which includes all or a portion of a curing agent. In such an instance, the curing agent usually constitutes about 0.1% to 20% by weight, and preferably about 7% to 14 by weight, of the total weight of phenol-novolac resins to be included in the molding material. A guideline regarding the total amount of curing agent for the molding material is provided below, along with a description of suitable agents.

A wide variety of fillers can also be included in the powdered resin blend or added to the coated abrasive grain prior to consolidating the matrix of materials. Nonlimiting examples of suitable fillers are sand, silicon carbide, alumina, bauxite, chromites, magnesite, dolomites, mullite, borides, fumed silica, sol gel materials, titanium dioxide, carbon products (e.g., carbon black, coke, or graphite); corundum, wood flour, clay, talc, hexagonal boron nitride, molybdenum disulfide, zirconia, and various forms of glass, such as glass fiber. Mixtures of more than one filler are also possible.

The effective amount for each filler or combination of fillers can be determined by those of ordinary skill in the art. The usual level of fillers for this invention is about 0.1 to about 30 parts by weight, based on the weight of the entire composition. In the case of abrasive wheels, the level of filler material is usually in the range of about 5 to 20 parts by weight, based on the weight of the disc.

The powdered resin blend also may include other ingredients typically employed in making abrasive articles.

Notable examples include antistatic agents; metal oxides such as lime, zinc oxide, magnesium oxide, and mixtures thereof; and lubricants such as stearic acid and glycerol monostearate. As in the case of fillers, the appropriate amount of each of these materials can readily be determined by those skilled in the art.

Phenol-novolac resin curing agents are well-known in the art. They are described, for example, in the above-mentioned patent of Grazen et al. Epoxide resins or amines, such as hexamethylene tetramine ("hexa") may be used as curing agents. Precursors of such materials may also be used. As an example, ammonium hydroxide is a suitable curing agent because it reacts with formaldehyde to form hexa. Hexa and its precursors are the preferred curing agents.

Effective amounts of the curing agent can be determined without undue experimentation. Usually, about 5 to about 20 parts (by weight) of curing agent are employed per 100 parts of total phenol-novolac resin. Those of ordinary skill in the area of resin-bound abrasive articles will be able to adjust this level, based on various factors, e.g., the particular types of resins used; the degree of cure needed, and the desired final properties for the articles: strength, hardness, and grinding performance. In the preparation of abrasive wheels, an especially preferred level of curing agent lies in the range of about 8 parts to about 15 parts by weight. As described above, it is often desirable to preblend all or a portion of the curing agent with the powdered resin.

Various mixers may be used to blend the abrasive material with the other components described above. Examples of suitable mixers are the Eirich (e.g., model RV02) and Littleford types, as well as a bowl-type mixer. The best results in terms or abrasive grain quality are usually achieved by using a low power mixer. Low power also prevents excessive part wear, as compared to wear characteristics when a higher power mixer is employed.

As an illustration of low power operation, the Eirich model mentioned above should be used at a slow pan speed, usually less than about 65 rpm, with a mixing agitator speed of less than about 2,000 rpm.

Bowl-type mixers are preferred. For this invention, these types of mixers are also operated at relatively low power, e.g., a pan speed of less than about 50 rpm. The bowl-type mixers often include one or more sets of paddles, which for this invention preferably operate at a speed of less than about 200 rpm. In the most preferred embodiments, the paddles operate at a speed of less than about 150 rpm, As mentioned above, the continuous blending of abrasive (already situated in the mixer, and usually preheated) with liquid and powdered resins and other bond components usually requires the simultaneous delivery of each component. Simultaneous addition readily permits the abrasive grains to become homogeneously coated with each component, as described below. The relative amount of each component being delivered to the mixer is measured so that the proportion of each component to the other during delivery is as constant as possible.

Blending times depend on a variety of factors related to processing and materials, e.g., the type of abrasive and binder resins employed, the presence or absence of fillers; the type and capacity of mixer equipment used; the quantities of materials being processed, etc. In general, blending time will range from about 3 minutes to about 6 minutes for a smaller scale of processing, e.g., 22.7 Kg (50 pounds) total material; and from about 3 minutes to about 8 minutes for a larger-scale situation, e.g., up 272.1 Kg to about (600 pounds) total material. Those of ordinary skill in abrasives processing will be able to select the most appropriate blending time, based in part on the teachings herein.

As mentioned above, the blending temperature during and after addition of the various components is usually in the range of about 80° C. to about 130° C. Preferably, the blending temperature is in the range of about 90° C. to about 125° C. The temperature tends to decrease during the blending process for several reasons. First, the blending system is usually open to the atmosphere, with a consequent loss of heat. Second, the dry bonding material is usually delivered to the mixer at room temperature. Thus, the final temperature of the mixture after blending is complete is usually in the range of about 65° C. to 90° C. The temperature drop is beneficial in some respects, since it tends to inhibit premature cure and agglomeration of the abrasive/resin system.

It should be noted that the process described herein does not call for the direct, intentional cooling of the blend from a relatively high temperature to a much lower temperature. This is to be contrasted with the teachings of the above-mentioned Gardziella patent for preparing abrasive discs. In example 10, Gardziella describes blending a liquid phenol-novolac resin at 140° C., and then cooling the blend to 90° C. Since the present invention does not require the high preliminary blending temperature of Gardziella, the direct cooling step specified therein is unnecessary and disadvantageous from a commercial point of view.

After blending is complete, the granular molding material can be stored for later use. It is a dry, flowable granular material upon cooling to ambient temperature. Furthermore, the granules are substantially dust-free, as opposed to molding materials prepared with a higher level of volatile ingredients.

After completion of the above-described process, the abrasive grains in the present invention have a homogeneous coating of the phenol-novolac resins. This homogeneity is demonstrated by examination of the granular material. The absence of significant regions where the dry bond is excessively concentrated is apparent. Similarly, the absence of significant tacky, liquid-resin-rich regions is noted.

Homogeneity is further demonstrated by a reduced amount of "loose material", i.e., material which does not adhere to the abrasive grains. Loose material can cause significant processing complications, and minimizing its presence is important. The total amount of resin which does not adhere to the abrasive grains after the blending step should be less than about 3% by weight, based on the total weight of the granular molding material. In preferred embodiments, the amount is less than about 1.5%. In especially preferred embodiments, e.g., where the granular molding material is to be used for the preparation of high performance abrasive wheels, the amount of this non-adherent material should be less than about 0.5%.

Another important attribute of granular molding material prepared by the present process is its storage stability. Unlike prior art compositions which contain a higher level of volatile organic chemical constituents, these molding materials generally do not undergo physical or chemical change due to evaporation over a period of time. As an example, a 600 pound sample can be stored at room temperature for at least 3 months, and then pressed and cured to form an abrasive article which has the same characteristics as an article prepared with a "freshly-blended" molding material. This permits the manufacture of molding material in a continuous operation and is an improvement over the batch operations used in conventional processes.

Instead of being stored, the granular molding material can be used immediately to prepare the abrasive articles. It is usually first passed through a screen to remove any agglomerates, and then conveyed directly to molding equipment. Thus, in preferred embodiments, there is no aging step between blending and molding, unlike most of the processes of the prior art. Since an aging step can be costly and time-consuming, elimination of such a step is a considerable advantage from a commercial point of view.

The molding materials may be molded, i.e., "pressed", by many of the techniques known in the art. Hot pressing, warm pressing, or cold pressing may be utilized. Hot pressing is described, for example, in a Bakelite publication, *Rutaphen®- Resins for Grinding Wheels- Technical Information.* (KN 50E -09.92 - G&S-BA), and in Another Bakelite publication: *Rutaphen Phenolic Resins - Guide/ Product Ranges/Application* (KN107/e -10.89 GS-BG), both of which are incorporated herein by reference. Useful information can also be found in *Thermosetting Plastics,* edited by J. F. Monk, Chapter 3 ("Compression Moulding of Thermosets"), 1981 George Goodwin Ltd. in association with The Plastics and Rubber Institute. This publication is also incorporated herein by reference. To illustrate, an abrasive article or grinding wheel can be prepared by placing the blended material in an appropriate mold, usually made of stainless-, high carbon-, or high chrom-steal. Shaped plungers may be employed to cap off the mixture. Cold preliminary pressing is sometimes used, followed by preheating after the loaded mold assembly has been placed in an appropriate furnace. The mold assembly can be heated by any convenient method: electricity, steam, pressurized hot water, hot oil or gas flame. A resistance- or induction-type heater may be employed. An inert gas like nitrogen may be introduced to minimize oxidation during curing.

The specific temperature, pressure and time ranges will depend on the specific materials employed, the type of equipment in use, and the dimensions 70.3 Kg/sq.cm (0.5 tsi) to about 703.2 Kg/sq.cm (5.0 tsi,) and preferably, from about 70.3 Kg/sqcm (0.5 tsi) to about 281.2 Kg/sqcm (2.0 tsi). The pressing temperature for this process is typically in the range of about 115° C. to about 200°; and preferably, from about 140° C. to about 170° C. The holding time within the mold is usually about 30 to about 60 seconds per millimeter of abrasive article thickness.

For the purpose of this disclosure, the scope of the term "hot pressing" includes hot coining procedures, which are known in the art. In a typical hot coining procedure, pressure is applied to the mold assembly after it is taken out of the heating furnace.

Cold pressing and warm pressing are the preferred techniques for thaw invention, in embodiments where energy- and time-conservation requirements are critical. Cold pressing is described in U.S. Pat. No. 3,619,151, which is incorporated herein by reference. A predetermined, weighed charge of the blended composition in initially delivered to and evenly distributed within the cavity of a suitable mold, e.g., a conventional grinding wheel mold. The material remains at ambient temperature, usually less than about 30° C. Pressure is then applied to the uncured mass of material by suitable means, such as a hydraulic press. The pressure applied will be in the range of about 70.3 Kg/sqcm (0.5 tsi) to about 2109.3 Kg/sqcm (15 tsi), and more preferably, in the range of about 140.6 Kg/sqcm (1 tsi) to about (6 tsi). The holding time within the press will usually be in the range of about 5 seconds to about 1 minute. It appears that the compacting pressure necessary for favorable results can be reduced up to about 20% by the use of lubricant-type materials such as graphite and stearates.

Warm pressing is a technique very similar to cold pressing, except that the temperature of the blended mix in the mold is elevated, usually to some degree below about 140° C., and more often, below about 100° C. The same general pressure and holding time parameters followed for cold pressing are followed here.

After either cold or warm pressing, the molded material is usually cured. Selection of a curing temperature depends on at least several factors, including the strength, hardness, and grinding performance desired for the particular abrasive article. Usually, the curing temperature will be in the range of about 150° C. to about 250° C. In more preferred embodiments, the curing temperature will be in the range of about 150° C. to about 200° C. Curing time will range from about 6 hours to about 48 hours. In many instances, the final curing temperature is reached in steps, i.e., passing through intermediate temperatures and holding periods. Such a technique enhances additional wetting of the dry components in the mixture with the liquid components. Those of ordinary skill in the abrasive arts will be able to select an appropriate cure schedule without undue effort.

After pressing and curing (in the case of cold or warm pressing) is completed, the abrasive articles are usually stripped from the mold and air-cooled. Subsequent steps are also possible, e.g., the edging and finishing of abrasive wheels, according to standard practice. For this invention, the porosity of the molded article after curing is usually in the range of about 0% to about 50%, and most often, in the range of about 4 % to about 30 %.

Finishing of abrasive wheels includes the truing or balancing of the wheels. The cured wheel is placed on a truing stand and the weight distribution in the wheel is determined. The balance measurement is in weight units, with a larger balancing weight indicating a wheel which is more out of balance. To correct wheel balance, portions of the sides of the wheel may be removed to achieve an acceptable balance weight.

The following examples further illustrate various aspects of this invention. They are not intended to limit it in any way. All parts and percentages are by weight, unless otherwise indicated.

Example 1

4095 g of aluminum oxide abrasive of grit sizes 20 and 24 (1:1 ratio) and 4749 g of zirconia-alumina abrasive of grit sizes 14 and 16 (1:1 ratio) were preheated to 125° C. and placed in a mixing bowl of 51 cm diameter. 817 g of the liquid phenol-novolac resin, heated to 125° C., were slowly added to the mixer simultaneously with 4644 g of preblended, dry material (material at room temperature) consisting of 1485 g of the second, powdered phenol-novolac resin, 1639 g iron pyrite, 922 g potassium sulfate, 454 g calcium oxide, and 145 g hexamethylenetetramine. During the mixing cycle, the bowl was rotating clockwise at 30 rpm. One set of agitator blades was rotating clockwise at 70 rpm, and another rake-like agitator was rotating counterclockwise at 110 rpm. Following a total mixing time of 6 minutes, the mixture temperature was at 75° C. The mixture at this point consisted of dry, flowable (resin/filler-coated abrasive) granules with less than 1% loose material.

The granular material was tested for bulk density using the ANSI procedure for Bulk Density of Abrasive Grains. In this method, the bulk density is determined by the weight of material required to fill a cylinder of known volume when the material is allowed to flow through a funnel and fall from a fixed height. The bulk density was determined to be 1.735 g/cm$^3$.

It is also possible to determine the flowability of a material by recording the time required for a precise weight (or volume) of material to fill the cylinder. The flowability of the material was determined to be 38.7 cm³/minute.

This flowability is in direct contrast to the flowability of "conventional" abrasive mixtures which could not be determined by the above technique, due to inability to flow from the funnel into the cylinder: a result of either excessive tackiness or excess loose material, preventing free flow.

The abrasive material may be blended with the two phenol-novolac resins by a discontinuous technique, which usually involves batch mixing, i.e., blending a portion of the liquid phenol-novolac with a portion of the powdered phenol novolac, followed by an additional portion of liquid resin, and an additional portion of powdered resin, and so forth. Two to four cycles of liquid and powder additions are typically undertaken. The curing agent can be delivered to the mixer at any appropriate time, before or during addition of the other ingredients, but is preferably preblended with the powdered resin.

Blending times and temperatures after all of the resin components have been added are generally in the same range as for the continues process. The same type of equipment may be used and the batch process does not require blending at high temperatures, e.g., 140° C., followed by a cooling step to take the blend to a much lower temperature, e.g., 90° C. After blending is complete, the resulting product is a dry, flowable granular material which is substantially dust-free. The abrasive grains are homogeneously coated with the phenol novolac resins and filter preblend (the organic bond). They are also storage-stable, and do not have to be aged before being molded.

The blended material is molded or "pressed" as above, but molding temperatures must be maintained below about 140° C., and preferably, below about 100° C. Even lower warm-pressing temperatures, e.g., below about 80° C., are sometimes desirable. In especially preferred embodiments, cold pressing is employed, i.e., the pressing temperature is less than about 30° C. The other pressing parameters described above are applicable for this embodiment as well.

The molded materials are usually cured as above. Those of ordinary skill in the art will be able to select an appropriate cure schedule without undue effort. The cured articles (for example, grinding wheels) can then be subjected to balance weight tests, reaming and other finishing steps.

Example 2

Sample A, based on this invention, was prepared by preheating 11,080.0 g of an abrasive blend of alumina and zirconia alumina (24 to 46 grit) to a temperature in the range of about 80° C. to about 120° C. The blend was then placed in a mixing bowl of 51 cm diameter, similar to that used for Example 1. 845.5 g of a low molecular weight phenol-novolac resin (phenol-formaldehyde molar ratio of 1:0.2 to 1:0.35 was used as the liquid resin. This material was preheated to a temperature sufficient to attain a viscosity of about 150 mPa (150 cp) to 800 mPa (800 cp) (i.e. , a temperature in the range of about 115° C.–130° C.). The powdered bond consisted of 2592.3 g of a pre-blended dry bonding material containing 963.3 g standard phenol novolac material, 848.0 g iron pyrite, 474.9 g potassium sulfate, 219.6 g calcium oxide, and 86.6 g hexamethylenetetramine. These materials were layered onto the abrasive grains in a series of three steps, with each step utilizing about one-third of the total amount of each component. Fixing parameters were similar to those used for Example 1, with a mixing temperature of about 120° C.

The resulting dry, flowable product contained only 0.5% of loose bond material (i.e., dry resin and fillers that were not adhering to the abrasive grain). The product was cold-pressed (pressing temperature of about 25° C.) into portable wheals having a diameter of 7 inches and a thickness of 0.285 inch. The wheels were then cured in a standard box oven at 175° C.–85° C. for 20 hours.

After curing, the wheel porosity for Sample A was 16% by volume, abrasive content was 48% by volume, and resin and filler content was 36% by volume.

Sample B was a standard process sample used as a comparison. Sample B had the same volume structure as sample A, and utilized the same abrasive, standard phenol novolac resin, and fillers. Sample B did not contain any of the low molecular weight phenol-novolac resin used in of the present invention. Instead, this sample contained small amounts (about 1.5% of the entire mix weight) of processing liquids, i.e., solvents, wetting agents, and dampening agents. Sample B also contained at liquid resole resin in an amount sufficient to equal the total volume of ingredients for Sample A.

Sample B was prepared by placing the abrasive material in a mix pan and pouring the liquid resole resin on top of it, followed by the addition of all of the dry mix components. The processing liquids were then added. The composition was then blended in its entirety, i.e., in a single step, at a temperature of about 25° C. Pressing and curing were then carried out in a manner substantially identical to that employed for Sample A.

After curing, the wheel porosity for Sample B wag 16% by volume, abrasive content was 48% by volume, and resin and filler content has 36% by volute.

Various tests were performed on segments of wheels based on the present invention and based on the comparative, standard process sample. The results, based on an average of about 10 segments for each wheel, were as follows:

| | Sample A | Sample B* |
|---|---|---|
| Heat Distortion Temperature: | 280° C. | 290° C. |
| Density: | 2.57 g/cm³ | 2.55 g/cm³ |
| MOR Strength** | 450 Kg/sq cm (6400 psi) | 429 Kg/sq cm (6100 psi) |
| Thermal Expansion (250° C.) | 0.3% | 0.25% |
| Wheel Burst Test*** | 9455 sMpm (31,000 sfpm) | 9455 sMpm (31,000 sfpm) |

*Comparative sample
**Modulus of Rupture
***Wheel mounted on hub, spun until force causes it to shatter or "burst"; speed in surface feet per minute recorded.

The data demonstrate that the properties of wheel samples prepared according to this embodiment of the present invention are generally equivalent to those prepared by processes of the prior art.

The wheels were also tested for grinding properties as compared to wheels made by the standard process. In regard to grinding ratio (i.e., the amount of a metal workpiece removed par amount of wheel wear), an average value of 20 to 25 Kg/Kg (20 to 25 lb/lb) was obtained, which was essentially equal to or greater (up to 10% higher) than that obtained for the standard process samples.

For Sample A, the same procssing was carried out, utilizing Eirich and Littleford high intensity mixers. Although the resulting wheel properties were similar to those obtained by the use of the bowl mixer, the bowl mixer is preferred because of its lower power operation.

Example 3

The process not forth in Example 2 was followed here to prepare cutting-off wheels, i.e., layering the resins onto the abrasive grains in a series of three steps. A bowl-type mixer similar to that used in Example 1 was employed here. The composition of Sample C, based on this invention, was as follows:

Abraeive: 4698.1 g alumina and 5614.2. g zirconia alumina, each 24 grit: The volume of abrasive in the final product was 50%.

Powdered phenol-novolac 832.2 g

Liquid (low mecular weight)phenol-novolac: 731,4 g (Each phenol-novolac resin constituted approximately 50% of the total volume of resin).

Other components: 1,029.7 g iron pyrite; 577.5 g potassium sulfate; 74.9 g hexamethylenetetramine The total volume for resins and fillers was 36%.

Blending was carried out as in Example 2, Sample A, After blending was complete, the dry, flowable granules were determined to contain 0.3% by volume of loose material. The product was then warm-pressed at a temperature of about 75° C. and a pressure of about 281.2–421.9 Kg/sq cm (2–3 tsi), and then cured in a standard box oven at 175° C. for 8 hours. Wheel porosity was 14% by volume.

A comparative sample, Sample D, had the same composition as sample B in Example 2, and was prepared in the same manner. Sample D had the same volume structure (i.e., abrasive, resin, and pore percentages) as Sample B in Example 2.

The material of Sample D was generally tacky and sticky after the blending step, in contrast to the dry, flowable material of Sample C. While in acme instances, tackiness may be desirable because it increases green strength, such a characteristic is often undesirable because it decreases material flow and processing. Furthermore, the tackiness is an indication of the presence of residual solvents, which cause odor and environmental problems.

Test bars were cut from each finished wheel, and various tests were performed on the bars. The results, on average (about 10 test bars), were as follows:

|  | Sample C | Sample D* |
|---|---|---|
| Heat Distortion Temperature: | 222° C. | 225° C. |
| Density: | 2.60 g/cm³ | 2.61 g/cm³ |
| MOR Strength** | 400.8 Kg/sq cm | 435.9 Kg/sq cm |
|  | (5700 psi) | (6200 psi) |
| Thermal Expansion (250° C.) | 0.4% | 0.35% |

*Comparative sample
**Modulus of Rupture

These results indicate that materials made by the process of embodiment B have properties which are substantially similar to those prepared by a standard process of the prior art. The modulus of rupture value is decreased somewhat for sample C, but is still very adequate for most end uses.

Furthermore, the properties for sample C have been obtained at pressing temperatures which are desirably lower than the hot pressing temperatures used in the prior art, without the need for a mix-aging step before pressing.

Example 4

Commercial scale abrasive wheels (60.9×7.6×30cm; 24×3×12 inches) containing the mix components described in Table I below, were fabricated using the granular molding materials of the invention and compared with conventionally processed wheels for balance.

TABLE I

| Mix Component Weight (g) | | | | |
|---|---|---|---|---|
|  | Wheel Sample[d] | | | |
|  | Controls | Inventions | | |
|  | C-1 | 5-1 | 5-4 | 5-7 |
|  | C-2 | 5-2 | 5-5 | 5-8 |
|  | C-3 | 5-3 | 5-6 | 5-9 |
| Powdered Pre-Blend | | | | |
| Chopped Glass Fiber | 708 | 736 | 677 | 709 |
| Powdered Resin[a] | 2,023 | 0 | 511 | 0 |
| Iron Pyrite | 5,220 | 4,945 | 1,338 | 4,761 |
| Saran | 210 | 217 | 138 | 210 |
| Potassium Sulfate | 1,002 | 933 | — | 899 |
| Calcium Oxide | 758 | 656 | 499 | 631 |
| Silicon Carbide | 1,529 | 1,459 | 1,843 | 1,405 |
| Hexamethylene Tetramine | 0 | 306 | 173 | 295 |
| Cedarwood Oil | 25 | 0 | 0 | 0 |
| Furfuraldehyde | 187.5 | 0 | 0 | 0 |
| Total: | 10,742 | 8,073 | 4,502 | 8,201 |
| Abrasive Grain[b] | 11,230 | 11,687 | 16,513 | 12,097 |
| Liquid Resin[c] | 0 | 1,737 | 985 | 1,672 |

[a]The powdered resin was a powdered phenolic resin sold under the Oxichem 29-318 trade name.
[b]Samples C-1, C-2, C-3, 5-1, 5-2 and 5-3 contained a 1:1 blend of 14 grit aluminum oxide: zirconia alumina. Samples 5-4, 5-5 and 5-6 contained a blend of 1:1 8:10 grit zirconia alumina. Samples 5-7, 5-8 and 5-9 contained 12 grit zirconia alumina.
[c]The liquid resin was Bakelite 8505F phenol-novolac resin obtained from Bakelite AG.
[d]Each batch of mix weighed a total of 22,680 g (50 lbs). Each wheel made from the mix contained 54,432 g (120 lbs) of mix (2.4 batches).

The wheels of the invention were prepared as described in Tables I and II, and in Example 1.

TABLE II

| Wheel Sample | Mix Components Wt. % | | | Balance[a] (g) | | |
|---|---|---|---|---|---|---|
|  | Grain | Resin | Other | Before Ream | After Ream | After Balance |
| Control-1 | 50 | 7.5 | 42.5 | 368.5 | 326.0 | 70.9 |
| Control-2 | 50 | 7.5 | 42.5 | 198.5 | 170.1 | 28.4 |
| Control-3 | 50 | 7.5 | 42.5 | 283.5 | 248.1 | 28.4 |
| Invention | | | | | | |
| 5-1 | 50 | 7.5 | 42.5 | 56.7 | 31.9 | — |
| 5-2 | 50 | 7.5 | 42.5 | 127.6 | 127.6 | 70.9 |
| 5-3 | 50 | 7.5 | 42.5 | 113.4 | 127.6 | 56.7 |
| 5-4 | 71.5 | 6.5 | 22 | 85.1 | 56.7 | — |
| 5-5 | 71.5 | 6.5 | 22 | 49.6 | 35.4 | — |
| 5-6 | 71.5 | 6.5 | 22 | 49.6 | 70.9 | — |
| 5-7[b] | 51.8 | 6.5 | 41.7 | 49.6 | 49.6 | — |
| 5-8[b] | 51.8 | 6.5 | 41.7 | 63.8 | 99.2 | 56.7 |
| 5-9[b] | 51.8 | 6.5 | 41.7 | 49.6 | 49.6 | — |

[a]Wheels were balanced by removing excess weight from side surfaces.
[b]Wheels were 60.9 × 7.6 × 20 cm (24 × 3 × 8 inches). None of the wheels of the invention required re-work to achieve acceptable wheel balance weight. The control wheels required 48% rework.

Example 5

The large scale abrasive wheels described in Table III were manufactured according to the invention (Example 1)

and compared with conventionally processed wheels in carbon steel and stainless steel grinding operations.

Wheel life results are shown in Table III.

TABLE III

| | | Mix Components Wt. (g) | | |
|---|---|---|---|---|
| Wheel Sample | Abrasive Grain | Liquid Resin | Powdered[a] Preblend | Wheel Life (Hours) |
| 1 Grit Control | 14 grit 38,335 | 0 2,287 | 14,518 12,230 | 3.25 3.6 |
| Invention | 38,335 | | | |
| 2 Grit Control | 12 grit 39,631 | 0 2,364 | 13,169 10,805 | 5.0 5.1 |
| Invention | 39,631 | | | |
| 3 Grit Control | 6 grit 39,631 | 0 2,364 | 13,169 10,805 | 7.5 11.9 |
| Invention | 39,631 | | | |
| 4 Grit Control | 20 grit 25,981 | 0 4,068 | 28,451 24,383 | 0.6 1.2 |
| Invention | 25,981 | | | |

[a]Samples contained the following preblends:

| | 1 | 2 and 3 |
|---|---|---|
| Chopped glass fiber | 655 | 677 |
| Powdered Resin | 494 | 511 |
| Iron pyrite | 2,823 | 1,338 |
| Saran | 178 | 138 |
| Potassium Sulfate | 790 | — |
| Calcium oxide | 643 | 499 |
| Silicon Carbide | — | 1,843 |
| Hexamethylene tetramine | 168 | 173 |
| Total | 5,096 | 4,502 |

These results demonstrate that the grinding wheels of the invention have improved wheel life during grinding operations relative to conventional wheels.

Example 6

Samples of grinding wheels were analyzed by GC/MS for volatile organic chemical content. Wheel stubs were analyzed for reachable phenol content, a key environmental cost factor in disposal of stubs in landfills. Results are shown in Table IV.

TABLE IV

| Wheel Sample[a] | V.O.C. | Phenol |
|---|---|---|
| Control | Kg/50 Kg Mix | ppm |
| 7-1 Example 1 | 1.3 | — |
| 7-2 Example 2 | 0.41 | — |
| 7-3 Example 3 Invention | 0.54 | — |
| 7-4 (Example 2) Control | 0.0 | — |
| 7-5 (Example 2) Invention | — | 0.181 |
| 7-6 (Example 2) | — | 0.100 |

[a]Wheels were made from mix formulations described in Example 1, 2 or 3, as indicated above.

The grinding wheels of the invention contain less free phenol (e.g., less than 0.3%, by weight) and a lower V.O.C. content (e.g., less than 0.5%, by weight) than conventional wheels.

Other modifications and variations of this invention are possible in view of the description thus provided. It should be understood, therefore, that changes may be made in the particular embodiments shown which are within the scope of the invention defined in the claims.

We claim:

1. A bonded abrasive article, consisting of a heat cured product of a consolidated matrix of abrasive grain granules, wherein the abrasive grain granules have a continuous, uniform surface coating of an organic bond; the consolidated matrix comprises less than 0.5%, by weight, volatile organic chemicals, and the bonded abrasive article has a uniform distribution of abrasive grain within the organic bond, whereby the bonded abrasive article provides at least a 2% increase in grinding life relative to an equivalent bonded abrasive article having a non-uniform distribution of abrasive grain within the organic bond.

2. The bonded abrasive article of claim 1, wherein the organic bond comprises at least one liquid phenol-novolac resin, having a phenol-formaldehyde molar ratio in the range of about 1:0.2 to about 1:0.35, a viscosity of 150 to 3,000 mPa (cp) at a temperature of 80 to 130° C., and a free phenol content of less than 0.5% by weight, and at least one curing agent.

3. The bonded abrasive article of claim 2, wherein the organic bond further comprises at least one powdered phenol-novolac resin.

4. The bonded abrasive article of claim 3, wherein the powdered phenol-novolac resin has a phenol-formaldehyde molar ratio of 1:0.5 to 1:0.9, a weight average molecular weight of 1,000 to 2,000 and a free phenol consolidated matrix content of less than 0.5%, by weight.

5. The bonded abrasive article of claim 2, wherein the curing agent is selected from the group consisting of hexamethylene tetramine and precursers thereof.

6. The bonded abrasive article of claim 1, wherein the abrasive grain is selected from the group consisting of aluminum oxide, silicon carbide, zirconia-alumina, garnet, emery, flint, diamond, cubic boron nitride, seeded sol-gel alumina, unseeded sol-gel alumina, and combinations thereof.

7. The bonded abrasive article of claim 1, wherein the bonded abrasive article comprises less than 0.3%, by weight, free phenol.

8. The bonded abrasive article of claim 1, wherein the bonded abrasive article is an abrasive wheel of at least 25 cm in diameter, and the abrasive wheel is substantially free of bond rich regions.

9. The bonded abrasive article of claim 1, wherein the bonded abrasive article is an abrasive wheel and wherein, in the absence of a truing operation on the abrasive wheel, the abrasive wheel has balanced rotational movement during grinding operations.

10. A method for preparing granular molding material for abrasive articles in a bowl mixer, characterized in that: (a) metered portions of at least one low molecular weight, liquid phenol-novolac resin having a phenol-formaldehyde molar ratio in the range of about 1:0.2 to about 1:0.35, heated to a temperature sufficient to yield a resin viscosity of about 150 mPa (cp) to about 3000 mPa (cp) are continuously blended with a portion of abrasive grain; (b) metered portions of powdered bond components comprising at least one curing agent continuously and simultaneously are added to the abrasive grain and liquid resin; and (c) blending temperatures are maintained in the range of about 80° C. to about 130° C.; whereby the granular molding material upon discharge from the bowl mixer is a flowable, granular abrasive grain homogeneously coated with at least 97%, by weight, of the added liquid resin and powdered bond components.

11. The method of claim 10, wherein the blending temperature is in the range of about 90° C. to about 125° C.

12. The method of claim 10, wherein the abrasive grain is heated to a temperature in the range of about $_{30}$° C. to about 150° C., prior to blending with the liquid and phenol-novolac resin.

13. The method of claim 10, wherein the abrasive grain is selected from the group consisting of aluminum oxide, zirconia-alumina, silicon carbide, garnet, emery, flint, seeded sol-gel alumina, unseeded sol-gel alumina, diamond, cubic boron nitride, and mixtures thereof.

14. The method of claim 13, wherein the average particle size of the abrasive grain is in the range of about 0.5 micrometer to about 5000 micrometers.

15. The method of claim 10, wherein at least one powdered phenol-novolac resin is continuously metered into the blend of the abrasive grain and liquid phenol-novolac resin.

16. The method of claim 15, wherein the curing agent is preblended with the powdered phenol-novolac resin to form a powdered preblend.

17. The method of claim 16, wherein the powdered preblend further includes at least one filler.

18. An improved method of manufacturing an abrasive article wherein the granular molding material of claim 10 is warm-pressed to form an abrasive article, without first being aged, at a pressing temperature less than about 140° C.

19. The method of claim 18, wherein the abrasive article is cured at a temperature in the range of about 150° C. to about 250° C.

20. An improved method of manufacturing an abrasive article, wherein the granular molding material of claim 10, is cold-pressed to form an abrasive article, without first being aged, at a pressing temperature less than about 30° C.

21. The method of claim 20, wherein the molding pressure during pressing is in the range of about 70.3 Kg/sq cm (0.5 tsi) to about 2108.3 Kg/sq cm (15 tsi).

22. The method or claim 20, wherein the abrasive article is cured at a temperature in the range of about 150° C. to 250° C.

23. An improved method of manufacturing an abrasive article wherein the granular molding material of claim 10 is hot-pressed to form an abrasive article, without first being aged, at a pressing temperature of about 140° C. to about 170° C.

24. The method of claim 23, wherein the molding pressure is in the range of about 70.3 Kg/sq cm (0.5 tsi) to about 703.1 Kg/sq cm (5.0 tsi).

25. The method of claim 10, wherein the blending is carried out in a bowl mixer equipped with a pan and paddles at a pan speed of less than about 50 rpm and paddles speed of less than about 200 rpm.

26. A grinding wheel prepared by a method comprising the steps of:

(a) providing a bowl mixer;

(b) continuously blending metered portions of at least one low-molecular weight, liquid phenol-novolac resin having a phenol-formaldehyde molar ratio in the range of about 1:0.2 to about 1:0.35, heated to a temperature sufficient to yield a resin viscosity of about 150 mPa (cp) to about 3000 mPa (cp) with a portion of abrasive grain;

(c) simultaneously and continuously adding metered portions of powdered bond components comprising at least one curing agent to the abrasive grain and liquid resin;

(d) maintaining blending temperatures in the range of about 80° C. to about 130° C.; whereby the granular molding material upon discharge from the bowl mixer is a flowable, granular abrasive grain homogeneously coated with at least 97%, by weight, of the added liquid resin and powdered bond components; and (e) warm-pressing the coated granular abrasive grain at a pressing temperature less than about 140° C. to form an abrasive article, without first aging the coated granular abrasive grain.

27. A grinding wheel prepared by a method comprising the steps of:

(a) providing a bowl mixer;

(b) continuously blending metered portions of at least one low-molecular weight, liquid phenol-novolac resin having a phenol-formaldehyde molar ratio in the range of about 1:0.2 to about 1:0.35, heated to a temperature sufficient to yield a resin viscosity of about 150 mPa (cp) to about 3000 mPa (cp) with a portion of abrasive grain;

(c) simultaneously and continuously adding metered portions of powdered bond components comprising at least one curing agent to the abrasive grain and liquid resin;

(d) maintaining blending temperatures in the range of about 80° C. to about 130° C.; whereby the granular molding material upon discharge from the bowl mixer is a flowable, granular abrasive grain homogeneously coated with at least 97%, by weight, of the added liquid resin and powdered bond components; and (e) cold-pressing the granular abrasive grain at a pressing temperature less than about 30° C. to form an abrasive article, without first aging the granular abrasive grain.

28. A grinding wheel prepared by a method comprising the steps of:

(a) providing a bowl mixer;

(b) continuously blending metered portions of at least one low-molecular weight, liquid phenol-novolac resin having a phenol-formaldehyde molar ratio in the range of about 1:0.2 to about 1:0.35, heated to a temperature sufficient to yield a resin viscosity of about 150 mPa (cp) to about 3000 mPa (cp) with a portion of abrasive grain;

(c) simultaneously and continuously adding metered portions of powdered bond components comprising at least one curing agent to the abrasive grain and liquid resin;

(d) maintaining blending temperatures in the range of about 80° C. to about 130° C.; whereby the granular molding material upon discharge from the bowl mixer is a flowable, granular abrasive grain homogeneously coated with at least 97%, by weight, of the added liquid resin and powdered bond components; and (e) hot-pressing the granular abrasive grain at a pressing temperature of about 140° C. to about 170° C. to form an abrasive article, without first aging the granular abrasive grain.

* * * * *